INVENTOR.
HAROLD F. WREDE
BY
ATTORNEY

United States Patent Office 3,370,116
Patented Feb. 20, 1968

3,370,116
METHOD FOR SPREADING TUBULAR NET
Harold F. Wrede, Basking Ridge, N.J., assignor to Union Carbide Corporation, a corporation of New York
Filed Dec. 30, 1964, Ser. No. 422,252
7 Claims. (Cl. 264—292)

ABSTRACT OF THE DISCLOSURE

Method is provided for imparting a lasting spread to tubular plastic net. The net is spread to at least a wrinkle-free periphery or spread to a larger size. The net is thereafter heated to an annealing temperature thereof to stabilize the net at its spread size.

---

This invention relates to a method for spreading tubular set net such as extruded or woven plastic net.

Plastic net is often produced in tubular form. For example, tubular plastic net is commonly extruded from tubular dies such as disclosed in U.S.P. 2,919,467 to Mercer.

These tubular nets, after being formed and set or after the further step of orientation, must often be spread to a desired form as for a given packaging operation or lay-flat form for even windup to a compact cylinder.

The phrase "set plastic net" refers to plastic net which is maintained between the first and second order transition temperatures of the plastic employed, i.e. below the softening temperature of the plastic and above the temperature at which the plastic becomes rigid or brittle, to provide a flexible sturdy net. The net may be made by an conventional process including extrusion and setting as by quenching, weaving of set plastic strands, cutting from a plastic tube and the like.

By "spreading" a tubular net is meant extending it to its wrinkle free periphery or beyond so as to stretch the tube, in one or more directions, up to the extent the nature of the plastic material will allow without rupture or other adverse effects such as unequal extension of the strands thereof.

Tubular net is commonly spread by passing it over a mandrel having a periphery about equal to or greater than the inner circumference of the tube. Such mandrels have generally been the captive mandrel type, i.e. those wholly enclosed by the tube and thus requiring indirect support. These include the floating mandrel, a mandrel supported by the surrounding tube and restrained from advancing therewith by means such as a surrounding ring which has an opening small enough to restrain the mandrel and yet allow passage of the tube therethrough. However, the floating mandrel is unsteady, tends to turn and twist the tube and pinches the passing fabric against the restraining ring subjecting it to considerable friction.

Another form of captive mandrel is disclosed in German Patent 1,126,835. This mandrel is supported within the tube by two sets of rollers mounted without so that the tube advances between rollers and mandrel. The mandrel terminates in two diverging spreader-frames. The outer ends of the spreader frames define the greatest width of the mandrel and also constitute the take-off end thereof. A series of idler rollers is mounted to each frame to engage the passing tube and assist its passage thereover. The support rollers are driven to advance the tube over the mandrel.

The above type of mandrel is suitable for tubular fabrics, such as film, which can maintain their spread and flattened form after exiting from the spreader bar. But if these fabrics are wrinkled or are to be stretched laterally by such mandrels the wrinkles tend to return or the tube width tends to constrict upon exiting from a mandrel, such as described above, even while passing through nip rolls to wind up.

The above tendency is particularly true of tubular net which, upon the release of tension, tends to spring back to its original geometry. For example, in the orientation of tubular plastic net, the net may be stretched principally in the axial direction of the tube so that the net meshes are considerably elongated. If the net is passed over a mandrel, such as the above, sized to spread the net and restore symmetry to the mesh pattern, the net issuing therefrom to wind up, will revert almost at once to its oriented pattern and a correspondingly reduced width. Thus, there is a need and a market for a process and apparatus for imparting a retentive or lasting spread to tubular plastic net.

Accordingly, it is an object of this invention to provide a method for imparting a lasting spread to tubular plastic net.

It is another object of this invention to provide a method for imparting a lasting spread to tubular plastic net in lay-flat form.

It is yet another object to provide an apparatus of simple construction for imparting a lasting spread to tubular net.

It is still another object to provide an apparatus including a relatively fixed mandrel having a predominantly flat, uniform periphery for imparting a lasting spread to tubular plastic net in lay-flat form.

These and other objects are accomplished in the present invention which provides a method for imparting a lasting spread to tubular net comprising; spreading preset tubular net at least to the wrinkle-free lateral periphery thereof, heating the spread net to an annealing temperature thereof to stabilize he net at substantially its spread size, and collecting the spread and set net.

This invention will become more apparent from the following detailed specification and drawing, in which.

Figure 1:
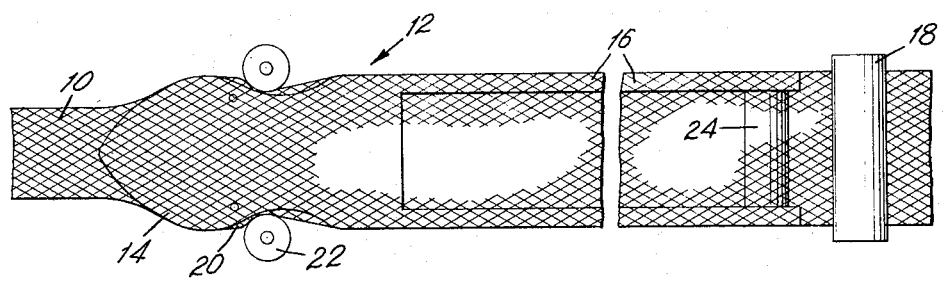
FIGURE 1 is a plan view of an apparatus showing the spreader mandrel, support rollers and take-off roller.
Figure 2:
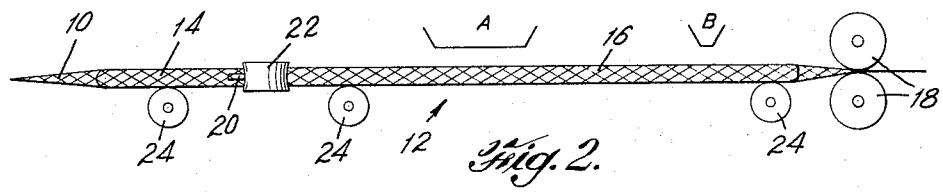
FIGURE 2 is a partial, sectional elevation of the apparatus illustrating the mandrel, support rollers and take-off rollers.

Referring now to the drawings, tubular net 10 passes over the head 14 and spreader bars 16 of the mandrel 12 to be spread to lay-flat form and then further flattened by nip rollers 18 as shown in FIGURES 1 and 2. The mandrel 12 is held in place by support rollers 22 and 24 as well as by the passing net 10.

Idler rollers 20 mounted to the mandrel head 14 cooperate with the support rollers 22 to reduce the friction on the passing net 10. Nip rollers 18 and support rollers 22 are preferably driven to assist the net over mandrel but support rollers 22 may be idler rollers or both sets of rollers may be idlers with the force to pass the net over the mandrel 12 and through the nip rollers 18 to take-off being provided by such take-off means such as a driven wind-up roller (not shown). Support rollers 24 are preferably idlers.

Station A provides a spray maintained at an annealing temperature for said net material to stabilize the spread net to substantially its spread size and station B provides a gas, preferably air, to dry the sprayed net as it passes over the mandrel 12 as shown in FIGURE 2.

Figure 3:
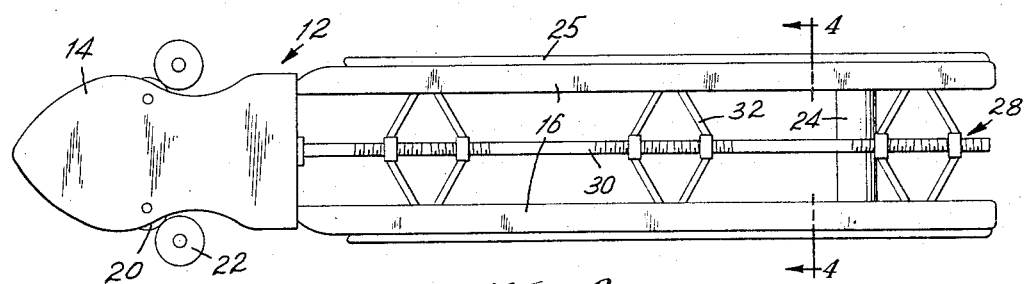
FIGURE 3 is a plan view of a modification of the mandrel.

In another embodiment the mandrel 12 may have adjustable spreader bars 16 which can be set to various distances of separations by an adjustable separator 28 shown in FIGURE 3. The adjustable separator has a threaded shaft 30 which is axially rotated to open and close pairs of pivotably mounted levers 32 which adjusts the separation of the spreader bars 16.

Figure 4:
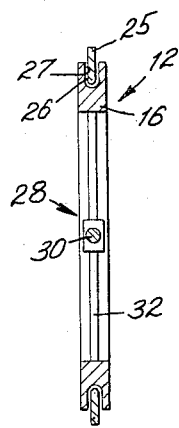
FIGURE 4 is an enlarged cross-sectional view of the mandrel of FIGURE 3, taken along the line 4—4, looking in the direction of the arrows.

Grooves 27 may be provided in the spreader bars 16, as shown in FIGURE 4, for receiving gusseting bars 25, partially inserted therein but completely separated therefrom by space 26, as illustrated in FIGURES 3 and 4. The gusseting bars are independently supported by conventional means (not shown). The tubular fabric is thus passed over the mandrel 12 and is spread and gusseted as opposed portions of the fabric pass through the space 26 between the gusseting bars 25 and the grooves 27.

This invention uses a captive mandrel of simple construction for spreading tubular fabric which is supported within the tube by rollers mounted without. The mandrel defines, at an extended portion, a constant lateral periphery which enables the fabric spread thereover to be stabilized at a uniform size when heated to an annealing temperature.

The mandrel may take any conventional shape provided at least a portion of the longitudinal sides are parallel, though not necessarily straight, to define a constant lateral periphery. For example, the mandrel may be partially or wholly cylindrical, substantially rectangular and the like. And it may be partially or wholly flat. Where it is desired to spread the tubular fabric to lay-flat form the tube take-off portion of the mandrel is preferably flat. Otherwise, the mandrel may be wholly cylindrical or of any other nonflat shapes as warranted by process demands without departing from the scope of this invention.

The mandrel should be of a size sufficient to spread the tubular net particularly at that portion where the net is annealed. Thus at least a portion of the mandrel defines a lateral periphery equal to or greater than the circumference of the tubular net to be treated.

The mandrel is supported within the tube preferably by rollers, which may be driven or idle, mounted without to relatively affix the mandrel while permitting the tubular net to pass therebetween. The support means may also be any other conventional type including stationary supports, independently supported, which present a smooth firm surface. To reduce friction at one or more of the support points, idler rollers, for example, may also be mounted to the mandrel.

The mandrel may have at least one depression therein on one of the longitudinal sides thereof adapted to receive a support means. One or more rollers may be mounted to the mandrel in the depression or a pair of rollers may define such depression for engaging such support relatively securing the mandrel in place.

The net take-off and collecting means may be any of those conventional in the art. A wind-up roller is suitable for pulling the net over the mandrel and also for further flattening the net under the tension of wind-up. In addition, common flattening means such as nip rollers, driven or idle, may be mounted between mandrel and wind-up rollers for flattening the net as it issues from the mandrel, though not essential.

The invention is suitable for spreading and annealing any tubular plastic net such as polyethylene, polypropylene, and the like.

By "annealing temperature" is meant the temperature suitable for stabilizing a stressed material and establishing dimensional stability. For thermoplastic net this temperature is equal to or above the temperature at which the plastic was quenched or set as it issued from the dies and below the softening temperature thereof. For oriented thermoplastic net this temperature is equal to or above the orientation temperature and below the softening temperature and preferably not lower than about 30° F. above the orientation temperature to assure substantially complete annealing. For low density polyethylene having a softening temperature of about 280° F. extruded at, for example, 380° F. and set at 115° F. in a quench bath, a suitable annealing temperature would lie in the range about 115° F. and below 280° F. Or, if after being set at 115° F., the net is oriented at 110° F. the net can be annealed at temperatures above 110° F. and below 280° F. and preferably between about 140° F. and 170° F. to relax the stresses due to orientation and spreading. These temperatures for stabilizing stressed plastic materials can thus be conveniently selected for a given tubular net by the skilled practitioner.

Within a given range, the higher the temperature the shorter the required residence time for the net to provide thorough annealing thereto. The residence time will vary with the type of plastic net as well as its density and strand thickness and may readily be determined by those skilled in the art. For low density polyethylene net of a strand diameter of .012 inch, the residence time at about 180° F. is suitably 1.2 seconds.

The annealing of the plastic net may be done by any conventional heating means adjusted to bring the net to a suitable annealing temperature, including a fluid bath or spray, radiant heat and the like. Where a liquid is used, such as a spray, the net is then dried, for example, by radiant heat or other suitable means including a stream of hot dry gas such as air or the hot dry gas could serve by itself to anneal the net. The temperature of the drying means may be of any value sufficient to evaporate or otherwise carry off the entrained liquid from the net.

Where annealing is not required, it will be recognized the mandrel is suitable for spreading any tubular fabric. The term "fabric" as used herein refers to any flexible material including fibrous woven and nonwoven material such as cloth or mats as well as film, plastic sheet and net of plastic or other material.

Annealing of such tubular fabrics is not essential, for example, where the given material is not spread beyond its inherent capacity to retain its spread size or where the fabric is to be spread only temporarily to a given size as for slitting the tube or for receiving an article to be packaged therein. Such spreading qualities of various fabrics are commonly known and the extent of spreading desirable for a given application may be readily determined by those skilled in the art for the practice of this invention.

The tube may be gusseted or pleated at at least one longitudinal surface while the tube is being spread and, where necessary, annealed. The spread and pleated tube may then be fashioned into gusseted bags similar to the common paper bag usually found in supermarkets which is pleated at two opposed sides. The pleats are preferably V-shaped and extending inwardly of the tube as found in the paper bag or may be W-shaped or other suitable forms.

The gusseting means may include bars, dull blades or rollers inserted in grooves in the mandrel of the invention at the annealing portion thereof. Such means are preferably spaced from the surfaces of the grooves at least the thickness of the spread fabric so as to shape, but yet allow the passage of the fabric over the mandrel. Where necessary, the gusseting means may be individually heated to assist the pleating of the fabric including annealing of plastic net.

What is claimed is:

1. A method for imparting a lasting spread in substantially lay-flat form constricted to preset tubular net comprising, passing tubular net over a captive mandrel having a lateral periphery at least substantially equal to the inner circumference of the tubular net to impart a spread thereto, heating the spread tubular net to an annealing temperature thereof to stabilize the net at substantially is spread size, and collecting the spread and set net.

2. The method of claim 1 wherein the spread net is annealed by a liquid spray and then dried by a stream of hot dry gas.

3. The method of claim 1 wherein the spread net is annealed by a stream of hot dry gas.

4. The method of claim 1 wherein the flat sides of the spread and stabilized tubular net are pressed together before the net is collected.

5. The method of claim 1 wherein the spread tubular fabric is gusseted at opposed edges of said flat form before being annealed.

6. The method of claim 1 wherein a lasting spread is imparted to oriented tubular plastic net.

7. The method of claim 1 wherein said tubular plastic net has been oriented by stretching the net in the axial direction of said tube at an orientation temperature for said net.

References Cited

UNITED STATES PATENTS

| | | |
|---|---|---|
| 2,502,514 | 4/1950 | Ewer. |
| 2,919,467 | 1/1960 | Mercer. |
| 3,140,330 | 7/1964 | Gutierrez. |
| 3,142,865 | 8/1964 | Richie _____ 264—177 |
| 3,144,494 | 8/1964 | Gerow _____ 264—210 |
| 3,178,328 | 4/1965 | Tittmann. |
| 3,222,440 | 12/1965 | Murphy. |

ROBERT F. WHITE, *Primary Examiner.*

R. R. KUCIA, *Assistant Examiner.*

UNITED STATES PATENT OFFICE
CERTIFICATE OF CORRECTION

Patent No. 3,370,116 February 20, 1968

Harold F. Wrede

It is hereby certified that error appears in the above numbered patent requiring correction and that the said Letters Patent should read as corrected below.

Column 4, line 67, for "constricted to" read -- to constricted --.

Signed and sealed this 29th day of April 1969.

(SEAL)
Attest:

Edward M. Fletcher, Jr.
Attesting Officer

EDWARD J. BRENNER
Commissioner of Patents